United States Patent
Chokshi et al.

(10) Patent No.: US 9,538,417 B1
(45) Date of Patent: *Jan. 3, 2017

(54) QUALITY OF SERVICE FOR MESH NETWORKS

(71) Applicant: Marvell International Ltd., Hamilton (BM)

(72) Inventors: Ronak Anjan Chokshi, Santa Clara, CA (US); Ashish Kumar Shukla, Yerwada (IN); Rajesh Shreeram Bhagwat, Maharashtra (IN)

(73) Assignee: Marvell International Ltd., Hamilton (BM)

( * ) Notice: Subject to any disclaimer, the term of this patent is extended or adjusted under 35 U.S.C. 154(b) by 494 days.

This patent is subject to a terminal disclaimer.

(21) Appl. No.: 14/042,378

(22) Filed: Sep. 30, 2013

Related U.S. Application Data

(63) Continuation of application No. 12/186,429, filed on Aug. 5, 2008, now Pat. No. 8,553,561.

(60) Provisional application No. 60/957,315, filed on Aug. 22, 2007.

(51) Int. Cl.
*H04W 28/02* (2009.01)

(52) U.S. Cl.
CPC .................. *H04W 28/0268* (2013.01)

(58) Field of Classification Search
CPC .......................... H04W 28/0268; H04W 28/24
USPC .............. 370/229, 235, 238, 230, 232, 234, 351,370/395.1, 395.4, 395.41, 395.42, 431, 442,370/443, 444
See application file for complete search history.

(56) References Cited

U.S. PATENT DOCUMENTS

| | | | |
|---|---|---|---|
| 5,940,769 A * | 8/1999 | Nakajima | H04L 1/1887 370/216 |
| 7,551,948 B2 | 6/2009 | Meier et al. | |
| 7,564,826 B2 | 7/2009 | Sherman et al. | |
| 7,626,966 B1 | 12/2009 | Ruiter et al. | |
| 7,686,216 B2 | 3/2010 | Walczyk et al. | |
| 7,711,004 B2 | 5/2010 | Xu | |
| 7,944,867 B2 | 5/2011 | Usuba | |
| 8,014,329 B2 | 9/2011 | Gong | |
| 8,064,363 B2 | 11/2011 | Kohvakka et al. | |
| 8,149,715 B1 | 4/2012 | Goel | |
| 8,170,002 B2 | 5/2012 | Wentink | |
| 8,189,506 B2 | 5/2012 | Kneckt et al. | |
| 8,274,894 B2 | 9/2012 | Kneckt et al. | |

(Continued)

OTHER PUBLICATIONS

"Non-Final Office Action", U.S. Appl. No. 14/293,640, Jul. 17, 2015, 17 pages.

(Continued)

*Primary Examiner* — Obaidul Huq

(57) ABSTRACT

Quality of service for mesh networks is described. In embodiment(s), communication data can be prioritized as priority data and/or non-priority data for communication from a source node to a destination node in a mesh network. A first route in the mesh network can be determined to communicate the priority data from the source node to the destination node based on a minimum number of intermediate nodes via which the priority data is communicated. Additionally, a second route in the mesh network can be determined to communicate the non-priority data from the source node to the destination node based on a highest bit rate to communicate the non-priority data. A time duration to communicate the priority via the first route is less than a time duration to communicate the non-priority data via the second route.

20 Claims, 9 Drawing Sheets

(56) References Cited

U.S. PATENT DOCUMENTS

| | | |
|---|---|---|
| 8,483,740 B2 | 7/2013 | Somasundaram et al. |
| 8,553,561 B1 | 10/2013 | Chokshi et al. |
| 8,767,771 B1 | 7/2014 | Shukla et al. |
| 8,902,745 B1 | 12/2014 | Goel et al. |
| 9,072,047 B1 | 6/2015 | Goel et al. |
| 9,294,997 B1 | 3/2016 | Shukla et al. |
| 2002/0025810 A1 | 2/2002 | Takayama et al. |
| 2002/0049854 A1 | 4/2002 | Cox et al. |
| 2003/0040316 A1 | 2/2003 | Stanforth et al. |
| 2004/0233881 A1 | 11/2004 | Kang et al. |
| 2004/0242192 A1 | 12/2004 | Marce et al. |
| 2004/0264372 A1 | 12/2004 | Huang |
| 2004/0264396 A1 | 12/2004 | Ginzburg et al. |
| 2004/0264397 A1 | 12/2004 | Benveniste |
| 2005/0041581 A1 | 2/2005 | Kuusinen et al. |
| 2005/0043027 A1 | 2/2005 | Emeott et al. |
| 2005/0047386 A1 | 3/2005 | Yi |
| 2005/0135360 A1 | 6/2005 | Shin et al. |
| 2005/0186962 A1 | 8/2005 | Yoneyama et al. |
| 2005/0233704 A1 | 10/2005 | Maekawa |
| 2005/0254423 A1 | 11/2005 | Berghoff |
| 2005/0281278 A1 | 12/2005 | Black et al. |
| 2006/0007863 A1 | 1/2006 | Naghian |
| 2006/0268804 A1 | 11/2006 | Kim et al. |
| 2006/0282541 A1 | 12/2006 | Hiroki |
| 2006/0282667 A1 | 12/2006 | Kim et al. |
| 2007/0010247 A1 | 1/2007 | Mouna-Kingue et al. |
| 2007/0178888 A1 | 8/2007 | Alfano et al. |
| 2007/0183368 A1 | 8/2007 | Stavinov |
| 2007/0206762 A1 | 9/2007 | Chandra et al. |
| 2007/0223626 A1 | 9/2007 | Waxman |
| 2007/0237122 A1 | 10/2007 | Liu et al. |
| 2007/0284441 A1 | 12/2007 | Walczyk et al. |
| 2007/0297388 A1 | 12/2007 | Appaji et al. |
| 2008/0069034 A1 | 3/2008 | Buddhikot et al. |
| 2008/0095058 A1 | 4/2008 | Dalmases et al. |
| 2008/0095059 A1 | 4/2008 | Chu |
| 2008/0137580 A1 | 6/2008 | Axelsson et al. |
| 2008/0170550 A1 | 7/2008 | Liu et al. |
| 2008/0187003 A1 | 8/2008 | Becker |
| 2009/0196227 A1 | 8/2009 | Bahr |
| 2009/0268652 A1 | 10/2009 | Kneckt et al. |
| 2010/0039974 A1 | 2/2010 | Toshimitsu et al. |
| 2010/0061244 A1 | 3/2010 | Meier et al. |
| 2010/0238793 A1 | 9/2010 | Alfano et al. |
| 2011/0002226 A1 | 1/2011 | Bhatti |
| 2011/0280219 A1 | 11/2011 | Fashandi et al. |
| 2011/0292925 A1 | 12/2011 | Ho et al. |
| 2013/0223418 A1 | 8/2013 | Schmidt |

OTHER PUBLICATIONS

"Supplemental Notice of Allowance", U.S. Appl. No. 13/429,071, Sep. 29, 2014, 2 pages.

"Supplemental Notice of Allowance", U.S. Appl. No. 13/429,071, Oct. 27, 2014, 2 pages.

"Notice of Allowance", U.S. Appl. No. 14/293,640, Nov. 12, 2015, 12 pages.

"Notice of Allowance", U.S. Appl. No. 13/099,169, Feb. 12, 2014, 11 pages.

"Non-Final Office Action", U.S. Appl. No. 13/429,071, Mar. 28, 2014, 8 pages.

"Notice of Allowance", U.S. Appl. No. 13/429,090, Feb. 20, 2015, 10 pages.

"Supplemental Notice of Allowance", U.S. Appl. No. 13/429,090, Mar. 30, 2015, 2 pages.

"Final Office Action", U.S. Appl. No. 13/429,090, Jul. 16, 2014, 13 pages.

"Notice of Allowance", U.S. Appl. No. 13/429,071, Jul. 31, 2014, 14 pages.

"Non-Final Office Action", U.S. Appl. No. 12/167,841, Jul. 15, 2011, 10 pages.

"Notice of Allowance", U.S. Appl. No. 12/167,841, Nov. 25, 2011, 11 pages.

"Non-Final Office Action", U.S. Appl. No. 13/099,169, Mar. 28, 2013, 12 pages.

"Non-Final Office Action", U.S. Appl. No. 13/429,090, Oct. 24, 2013, 13 pages.

"Non-Final Office Action", U.S. Appl. No. 12/186,429, Apr. 25, 2011, 19 pages.

"Supplemental Notice of Allowance", U.S. Appl. No. 12/186,429, Jul. 10, 2013, 2 pages.

"Final Office Action", U.S. Appl. No. 12/186,429, Oct. 13, 2011, 23 pages.

"Draft Standard for Information Technology—Telecommunications and information exchange between systems—Local and metropolitan area networks—Specific requirements", IEEE P802.11s/D1.03, Apr. 2007, 251 pages.

"Restriction Requirement", U.S. Appl. No. 12/167,841, May 12, 2011, 6 pages.

"Notice of Allowance", U.S. Appl. No. 12/186,429, Jun. 6, 2013, 9 pages.

"Non-Final Office Action", U.S. Appl. No. 13/099,169, Oct. 4, 2013, 9 pages.

Haas, et al.,' "Gossip-Based Ad Hoc Routing", IEEE/ACM Transactions on Networking, vol. 14, No. 3, Jun. 2006, pp. 479-491.

\* cited by examiner

QUALITY OF SERVICE FOR MESH NETWORKS

RELATED APPLICATION

This application is a continuation of and claims priority to U.S. Utility patent application Ser. No. 12/186,429 filed Aug. 5, 2008, entitled "Quality of Service for Mesh Networks" which in turn claims priority to U.S. Provisional Patent Application Ser. No. 60/957,315 filed Aug. 22, 2007, entitled "QoS over Mesh Networks", the disclosures of which are incorporated by reference herein in their entirety.

BACKGROUND

A mesh network can be implemented as a wired or wireless communication network of various fixed and/or mobile devices that are commonly referred to as "nodes" of the mesh network. Each of the node devices can receive and communicate data throughout the mesh network, such as throughout a college campus, metropolitan area, community network, and across other geographic areas. A node device can also function to route data from one node to another within the mesh network. In addition, each node typically has more than one communication link to and/or from other nodes of the network, which provides for redundant communication links and a reliable communication system.

A wireless mesh network can include various wireless clients and devices implemented for wireless communication utilizing a data packet routing protocol. For example, the Institute of Electrical and Electronics Engineers (IEEE) Standard 802.11s describes Mesh Networking for wireless communications over a wireless local-area-network (WLAN). A wireless mesh network can also be implemented for data communication with other networks that are communicatively linked to the mesh network, such as with another wireless network, wired network, wide-area-network (WAN), and the like.

In a wireless mesh network, communication links are formed between the various wireless clients and devices that are the nodes of the network. The data packets for wireless communications in the network can be forwarded or routed from a source node (e.g., transmitting device) to a destination node (e.g., receiving device) via intermediate node(s), which are commonly referred to as "hops" in a multi-hop wireless mesh network.

In a conventional implementation of a wireless mesh network, the data packets for wireless communications are queued at an intermediate node in a first-in, first-out (FIFO) buffer queue, and the data packets are then transmitted or forwarded to the next best hop along a communication path with no prioritization of the data packets. The conventional implementation also assumes that the data packets are delivered from a source node to the destination node along a communication path via the various intermediate nodes having the highest data communication bit rate.

SUMMARY

This summary is provided to introduce concepts for quality of service for mesh networks. The concepts are further described below in the Detailed Description. This summary is not intended to identify essential features of the claimed subject matter, nor is it intended for use in determining the scope of the claimed subject matter.

In embodiment(s) of quality of service for mesh networks, a method can be implemented to prioritize communication data as at least one of priority data or non-priority data for communication from a source node to a destination node in a mesh network; determine a first communication route in the mesh network to communicate the priority data from the source node to the destination node based on a minimum number of intermediate nodes via which the priority data is communicated; and determine a second communication route in the mesh network to communicate the non-priority data from the source node to the destination node based on a highest bit rate to communicate the non-priority data.

In other embodiment(s), a node device in a mesh network includes a data priority monitor to prioritize communication data as at least one of priority data or non-priority data for communication from a source node to a destination node in a mesh network. The node device also includes routing logic to determine a first communication route in the mesh network to communicate the priority data from the source node to the destination node based on a minimum number of intermediate nodes via which the priority data is communicated; and to determine a second communication route in the mesh network to communicate the non-priority data from the source node to the destination node based on a highest bit rate to communicate the non-priority data.

In other embodiment(s), computer-readable media comprises computer-executable instructions that, when executed, implement a routing algorithm to prioritize communication data as at least one of priority data or non-priority data for communication from a source node to a destination node in a mesh network; determine a first communication route in the mesh network to communicate the priority data from the source node to the destination node based on a minimum number of intermediate nodes via which the priority data is communicated; and determine a second communication route in the mesh network to communicate the non-priority data from the source node to the destination node based on a highest bit rate to communicate the non-priority data.

BRIEF DESCRIPTION OF THE DRAWINGS

Embodiments of quality of service for mesh networks are described with reference to the following drawings. The same numbers are used throughout the drawings to reference like features and components.

DETAILED DESCRIPTION

Embodiments of quality of service for mesh networks provide that priority data can be communicated via a first communication route in a mesh network in less time than non-priority data is communicated via a second communication route in the mesh network. In various embodiments, the first communication route is referred to as the shortest communication route and the second communication route is referred to as the best communication route. The second or best communication route can be determined based on the highest bit rate for a determined communication path. However, processing delays that are compounded with each hop at an intermediate node along the second or best communication route in a multi-hop mesh network can delay communication of the data. The communication delay along the second or best communication route can be longer than if a first or shortest communication route is utilized that may have a significantly slower bit rate, yet fewer hops at intermediate nodes along the communication route.

For time-sensitive applications, such as for voice data and/or video data, a fewer number of hops along a shorter communication route can decrease the delays that would accumulate at each additional hop along a communication route that has a higher bit rate. The various delays can accumulate due to link management, data packet queuing, transmission of the data packets, and other processing delays at each of the intermediate nodes.

While features and concepts of the described systems and methods for quality of service for mesh networks can be implemented in any number of different environments, systems, networks, and/or various configurations, embodiments of quality of service for mesh networks are described in the context of the following example networks and environments.

Figure 1:
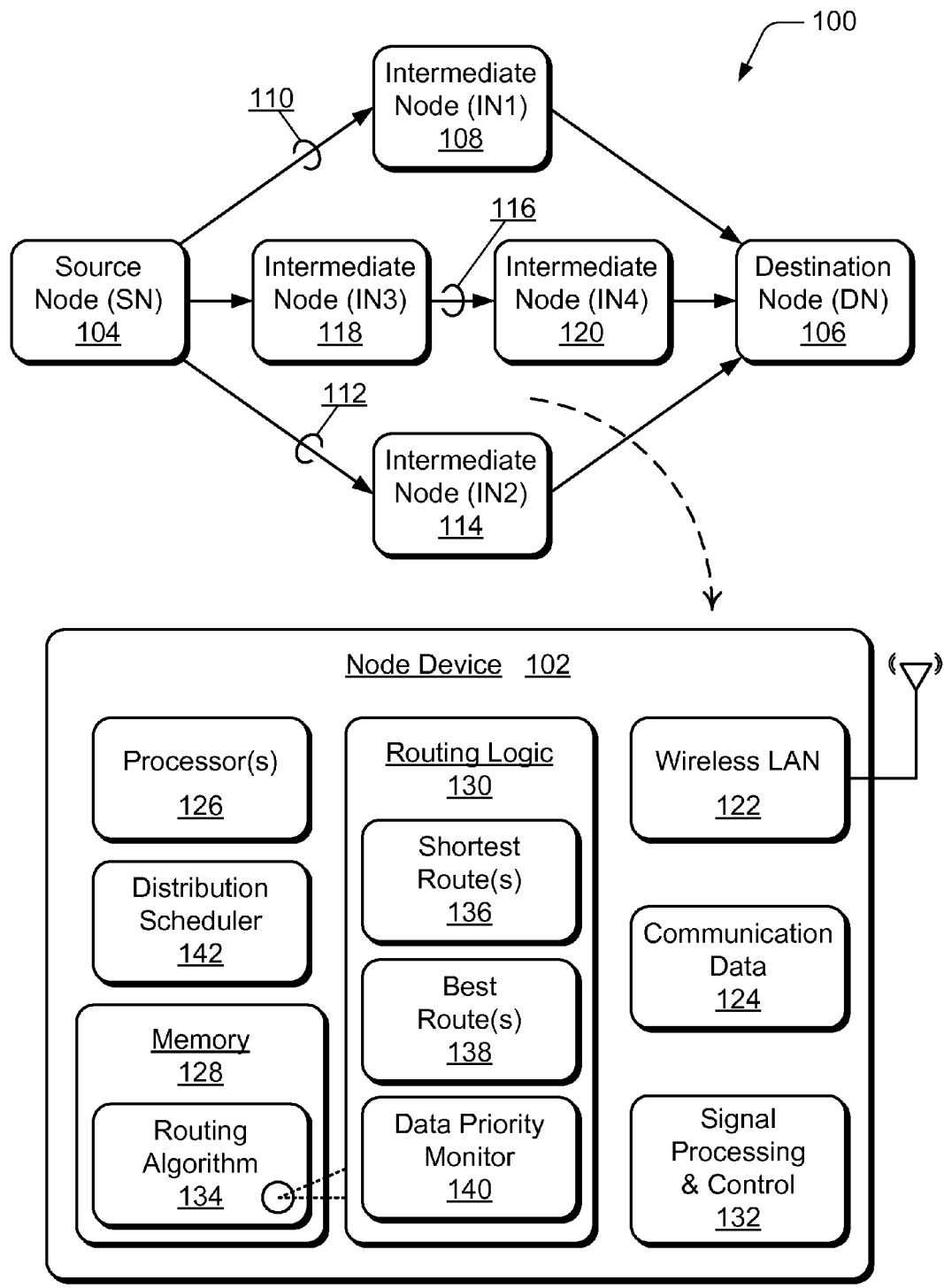
FIG. 1 illustrates an example mesh network in which embodiments of quality of service for mesh networks can be implemented.

FIG. 1 illustrates an example mesh network 100 that can be implemented as a wired or wireless communication network in which various node devices can implement embodiments of quality of service for mesh networks. The mesh network 100 can be implemented with various fixed and/or mobile devices that are the nodes of the network. Some examples of various devices that can serve as a node device in a mesh network are described below with reference to FIGS. 6-13. Each of the node devices can receive and communicate data (e.g., route data, transmit data, broadcast data, etc.) throughout the mesh network, as well as function as a router or relay to forward data from one node to another within the mesh network.

An example node device 102 can be implemented as any one of a source node (SN) 104, a destination node (DN) 106, and/or as any number of intermediate nodes (IN) in the mesh network 100. Example node device 102 represents any type of fixed or mobile communication-enabled device implemented for data communication as a node in a mesh network. For example, node device 102 can be any one or combination of a media device, computer device, telephone (e.g., cellular, VoIP, WiFi, etc.), high definition television (HDTV), television set-top box, appliance device, gaming device, electronic device, vehicle, workstation, access point, and/or as any other type of device implemented for data communication as a node in a mesh network.

In one or more embodiments, source node 104 can receive and/or initiate wireless communication data that can be prioritized as priority data and/or non-priority data for communication to the destination node 106 in the mesh network 100. Voice data and video data are examples of priority data that is time-critical and imposes a time-sensitive factor when communicating the priority data within a mesh network. Best-effort data and background data, such as network and control information, are examples of non-priority data that are not as time-critical as the priority data.

In one or more embodiments, a shortest communication route 110 in the mesh network 100 can be determined to communicate priority data from the source node 104 to the destination node 106. The shortest communication route 110 can be based on a minimum number of intermediate nodes via which the priority data is communicated. For example, priority data can be communicated from the source node (SN) 104 to the destination node (DN) 106 via only one intermediate node (IN1) 108 (i.e., the shortest communication route 110 is SN→IN1→DN).

An additional shortest communication route 112 in the mesh network 100 can also be determined to communicate priority data from the source node 104 to the destination node 106. The priority data can be communicated from the source node (SN) 104 to the destination node (DN) 106 via an intermediate node (IN2) 114 (i.e., the additional shortest communication route 112 is SN→IN2→DN). The priority data can be communicated in the mesh network 100 via the additional shortest communication route 112 if the previously determined shortest communication route 110 fails, such as if a communication link between two of the mesh nodes fails. Alternatively or in addition, priority voice data can be communicated via the shortest communication route 110 and priority video data can be communicated via the additional shortest communication route 112.

In one or more embodiments, a best communication route 116 in the mesh network 100 can also be determined to communicate non-priority data from the source node 104 to the destination node 106. The best communication route 116 can be based on a highest bit rate to communicate the non-priority data. For example, non-priority data can be communicated from the source node (SN) 104 to the destination node (DN) 106 via any number of intermediate nodes (IN3) 118 and (IN4) 120 (i.e., the best communication route 116 is SN→IN3→IN4→DN).

An additional best communication route in the mesh network 100 can also be determined to communicate the non-priority data from the source node 104 to the destination node 106 if the previously determined best communication route 116 fails. Alternatively or in addition, non-priority best-effort data can be communicated via the best communication route 116 and non-priority background data can be communicated via an additional best communication route in the mesh network 100.

When the shortest communication route 110 and the best communication route 116 are determined in the mesh network 100, the priority data can then be communicated via the shortest communication route 110 in less time than the non-priority data can be communicated via the best communication route 116. Processing delays that are compounded with each hop at an intermediate node along the best communication route 116 in a multi-hop mesh network (e.g., mesh network 100) can delay the communication data longer than if the shortest communication route 110 is utilized that may have a slower bit rate, yet fewer hops at intermediate nodes.

For example, the shortest communication route 110 (i.e., SN→IN1→DN) may have a bit rate of only eleven (11) Mbps, while the best communication route 116 (i.e., SN→IN3→IN4→DN) has a bit rate of fifty-four (54) Mbps. Although the data packet transmission time is longer via the shortest communication route 110, priority data can be routed faster along the shortest communication route 110 because of the delays imposed by the additional intermediate nodes along the best communication route 116.

In another example, a data packet for voice communication having a payload of two-hundred (200) bytes can be communicated from a source node to a destination node over six hops in a mesh network via a best communication route having a WiFi rate of fifty-four (54) Mbps. If the delay time at each of the six intermediate nodes (i.e., the hops) is eight-hundred and ninety (890) micro-seconds, it will take approximately 5,340 micro-seconds for transmission of the data packet via the best communication route. The same data packet can be communicated from the source node to the destination node over two hops in the mesh network via the shortest communication route having a WiFi rate of only two (2) Mbps. If the delay time at each of the two intermediate nodes is 2,458 micro-seconds, it will take approximately 4,916 micro-seconds for transmission of the data packet via the shortest communication route. This is approximately four-hundred and twenty-four (424) (i.e., 5,340-4,916) fewer micro-seconds than transmission of the data packet via the best communication route having the higher bit rate.

The processing delays at an intermediate node in a mesh network includes the time that each node spends for link management just to exchange node information and maintain the multi-hop link within the network. In addition, the contention for particular nodes along determined communication routes in the mesh network, as well as queuing and transmission delays at each of the intermediate nodes, can add to the processing delays which may be in the order of approximately six-hundred (600) to seven-hundred (700) micro-seconds per node. The delays can scale significantly and impact data communication (e.g., voice transmissions) even for just a few intermediate nodes along a communication route. For time-sensitive applications, such as for voice data and/or video data, a fewer number of hops along a shorter communication route can decrease the delays that accumulate due to link management, data packet queuing, transmission of data packets, and other processing delays at each of the intermediate nodes, even though the shorter communication route may have a significantly slower bit rate than the best communication route.

The example node device 102 includes various components to enable wireless communication as a node in the mesh network 100, and to implement embodiments of quality of service for mesh networks. In addition, node device 102 can be implemented with any number and combination of differing components as further described with reference to the example device shown in FIG. 5. A node device in mesh network 100 may also be associated with a user (i.e., a person) and/or an entity that operates the device such that a node device describes logical devices that include users, software, and/or a combination of devices.

In this example, the various components of node device 102 include wireless LAN (WLAN) components 122, such as a communication interface and/or transceiver, that enables wireless communication of communication data 124 (e.g., received communication data, communication data that is being received, communication data scheduled for broadcast, data packets of the communication data, etc.). Node device 102 also includes one or more processor(s) 126 (e.g., any of microprocessors, controllers, and the like), and memory 128, such as any type of random access memory (RAM), a low-latency nonvolatile memory such as flash memory, read only memory (ROM), and/or other suitable electronic data storage.

Node device 102 includes routing logic 130 that implements embodiments of quality of service for mesh networks. In an implementation, routing logic 130 may be any one or combination of hardware, firmware, or fixed logic circuitry that is implemented in connection with signal processing and control circuits which are generally identified at 132.

Alternatively and/or in addition, the routing logic 130 may be provided at node device 102 as a routing algorithm 134 that is implemented as computer-executable instructions maintained by memory 128 and executed by processor(s) 126 to implement various embodiments and/or features of quality of service for mesh networks. Any reference to the routing logic 130 herein also refers to the routing algorithm 134 throughout the description.

The routing logic 130 (e.g., including routing algorithm 134) can be implemented to determine an N number of shortest communication route(s) 136 and an N number of best communication route(s) 138 in a mesh network. The routing logic 130 can also determine that priority data can be communicated via the shortest communication route 110 in less time than non-priority data can be communicated via the best communication route 116. In an embodiment, the routing logic 130 can also determine an optimal communication route that is both the best communication route having the highest bit rate and the shortest communication route having the minimum number of intermediate nodes.

In this example, the routing logic 130 includes a data priority monitor 140 that can be implemented to prioritize the communication data 124. The Institute of Electrical and Electronics Engineers (IEEE) Standard 802.11s for Mesh Networking provides a data packet configuration that includes a user priority field, which can be utilized as a quality of service metric to indicate the priority of the payload for a particular data packet, such as to indicate priority voice data or video data. The data priority monitor 140 can determine data packet priority from the quality of service metric in the packet header such that the data packets are routed as either priority data or non-priority data.

The routing logic 130 can also be implemented to prioritize the intermediate nodes that are implemented to support quality of service for communication of the priority data in the mesh network 100 via the shortest communication route 110. The routing logic 130 can find or otherwise determine the communication routes that support quality of service for priority voice and/or video data, or at least a maximum number of intermediate nodes along a communication route that supports quality of service.

In this example, node device 102 also includes a distribution scheduler 142 that can be implemented as computer-executable instructions and executed by the processor(s) 126. The distribution scheduler 142 can schedule priority data for communication before non-priority data at a node device that receives both the priority data and the non-priority data. In addition, the distribution scheduler 142 can be implemented to drop the non-priority data to facilitate communication of the priority data if the node device receives both the priority data and the non-priority data, and if an abundance of data traffic causes congestion at the node device.

In an embodiment, the routing logic 130 at a node device in the mesh network 100 can be further implemented to initiate routing all route request packets from the source node 104 to the destination node 106 via the intermediate nodes, and then initiate routing all of the route request packets back to the source node 104 from the destination node 106. The routing logic 130 can utilize a route request, route reply query cycle to determine the shortest communication route(s) 136 and/or the best communication route(s) 138 in the mesh network 100. The mesh nodes (i.e., the intermediate nodes) can receive a route request packet that is broadcast by the source node 104, and keep track of the various route requests through source IP addresses and broadcast IDs. When the route request packets reach the destination node 106, the route replies are propagated back through the respective originating nodes and then to the source node. The source node can begin to broadcast or otherwise forward the communication data along a determined communication route.

In an implementation, the amount of route request traffic can be limited at a node device if the routing logic 130 is implemented to forward and reply to only the route request packets for the better routes when determining the communication routes in a mesh network. In addition, the routing logic 130 at node device 102 can be implemented to determine an optionally configurable N number of shortest communication route(s) 136 and best communication route(s) 138 in a mesh network. The multiple route determinations provide for additional and/or backup routes in an event that an initially determined communication route fails. In addition, the multiple communication routes provide that heavy data traffic within the mesh network 100 can be distributed throughout the various mesh nodes.

In one or more embodiments, the routing logic 130 can also be implemented to include a route refresh mechanism, such as at the intermediate nodes along a communication route. Typically, a determined communication route remains active and is maintained as long as communication data packets are periodically communicated via the communication route. When the source node 104 stops sending data packets via the communication route, the link will time out. In addition, a node device at a mesh node can periodically shut down which will likely cause a communication route failure. The route refresh mechanism can be implemented to maintain determined communication routes as long as there are data packets in a distribution queue that are not expired.

Although illustrated and described as separate components within node device 102, the routing logic 130 (and/or routing algorithm 134), data priority monitor 140, and distribution scheduler 142, can be implemented together as a multi-functional component of the node device. Alternatively, the separate components can each be implemented as several component applications or modules distributed to implement various embodiments of quality of service for mesh networks. In addition, node device 102 can include a system bus or data transfer system (not shown) that couples the various system components within the node device. A system bus can include any one or combination of different bus structures, such as a memory bus or memory controller, a peripheral bus, a universal serial bus, and/or a processor or local bus that utilizes any of a variety of bus architectures.

Figure 2:
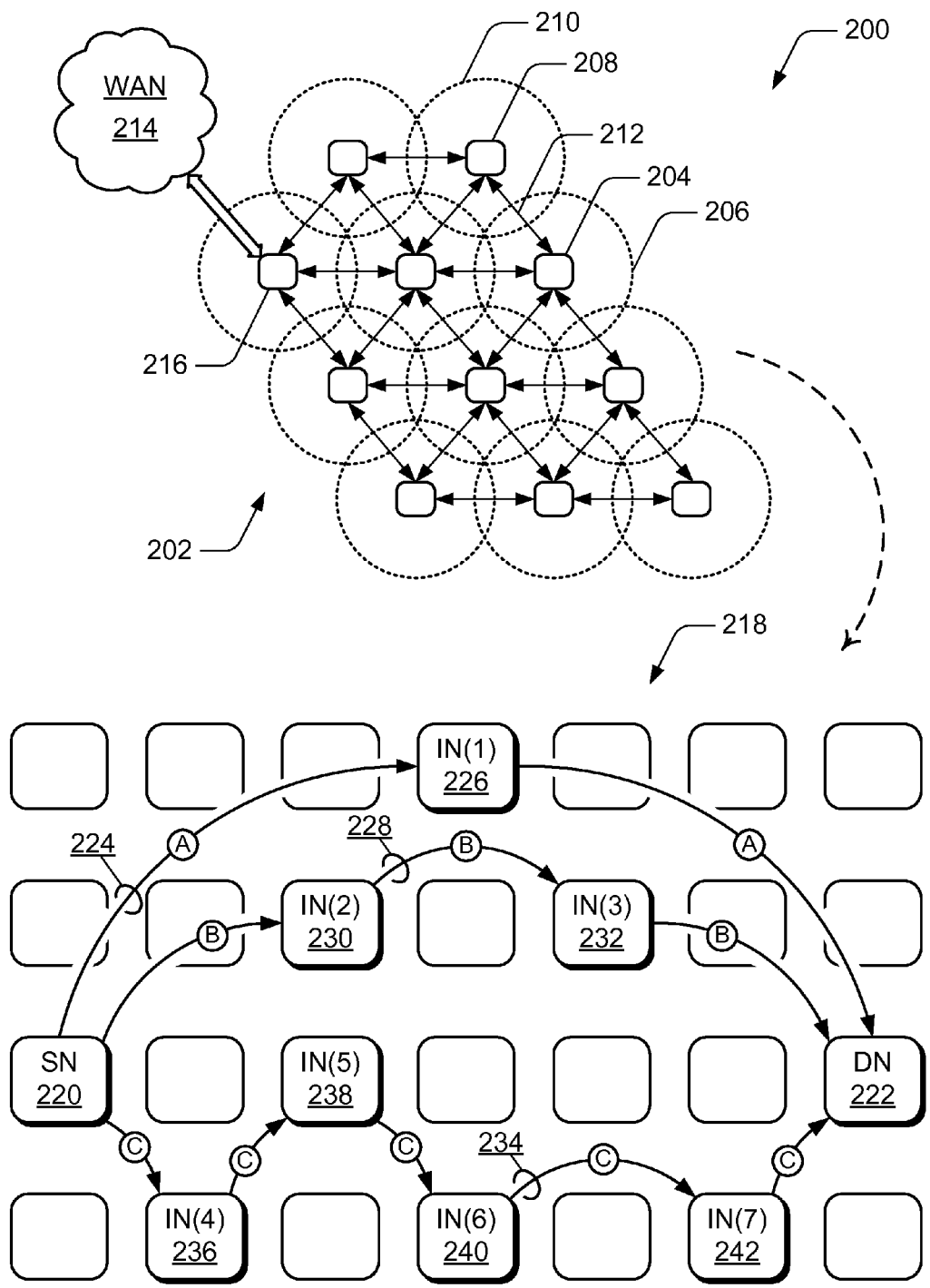
FIG. 2 illustrates an example environment that includes a mesh network in which embodiments of quality of service for mesh networks can be implemented.

FIG. 2 illustrates an example environment 200 that includes a mesh network 202 which can be implemented as a wired or wireless communication network in which various node devices can implement embodiments of quality of service for mesh networks. A mesh node 204 is illustrative of the various nodes that are communicatively linked to form the mesh network 202 with wired and/or wireless communication links. For example, mesh node 204 can be implemented as a wireless communication device having a data communication range depicted at 206. A neighboring mesh node 208 also has a data communication range depicted at 210 that overlaps the communication range of mesh node 204 such that the two nodes are communicatively linked for wireless data communication. Alternatively or in addition, the two neighboring mesh nodes can be communicatively linked via a wired connection.

The various node devices can receive and communicate data throughout the mesh network 202, and any of the node devices can also function as a router or relay to forward data from one node to another within the mesh network. The arrowed communication links, such as communication link 212 that links mesh node 204 with mesh node 208, are merely exemplary to depict the wired and/or wireless communication links and/or routes between the various node devices that are communicatively linked to form the mesh network 202. It is contemplated that any one or more of the arrowed communication links facilitate two-way data communication, such as from mesh node 204 to mesh node 208 and vice-versa.

The mesh network 202 can also be implemented for data communication with other networks that are communicatively linked to the mesh network, such as with another wireless network, wired network, wide-area-network (WAN) 214, and the like. The mesh network 202 also includes a mesh node 216 that is a root node (also commonly referred to as a "portal") of the mesh network 202 that connects the network to an external device or other network, such as the WAN 214 (e.g., the Internet or a Public Switched Telephone Network (PSTN)).

In one or more embodiments, mesh network 202 is an example of the mesh network 100 described with reference to FIG. 1 and is implemented with node devices (e.g., node device 102) that wirelessly receive and communicate data utilizing a wireless networking standard. For example, mesh network 202 can be implemented in a wireless LAN (WLAN) communication system in which data packets of the communication data are communicated compliant with the Institute of Electrical and Electronics Engineers (IEEE) Standard 802.11s.

In the example environment 200, a subset of the mesh network 202 is shown as a mesh network 218 in which various node devices can implement embodiments of quality of service for mesh networks. The example node device 102 described with reference to FIG. 1 can be implemented as any one of a source node (SN) 220, a destination node (DN) 222, and/or as any number of intermediate nodes (IN) in the mesh network 218. The source node 220 can receive and/or initiate wireless communication data that can be prioritized as priority data and/or non-priority data for communication to the destination node 222 in the mesh network 218. Voice data and video data are examples of priority data, and best-effort data and background data are examples of non-priority data.

In one or more embodiments, a shortest communication route A at 224 in the mesh network 218 can be determined to communicate priority voice data from the source node 220 to the destination node 222. The shortest communication route A at 224 can be based on a minimum number of intermediate nodes via which the priority data is communicated. For example, priority voice data can be communicated from the source node (SN) 220 to the destination node (DN) 222 via only one intermediate node (IN1) 226 (i.e., the shortest communication route A at 224 is SN→IN1→DN).

An additional shortest communication route B at 228 in the mesh network 218 (i.e., a next available shortest communication route) can also be determined to communicate priority video data from the source node 220 to the destination node 222. The priority video data can be communicated from the source node (SN) 220 to the destination node (DN) 222 via only two intermediate nodes (IN2) 230 and (IN3) 232 (i.e., the additional shortest communication route B at 228 is SN→IN2→IN3→DN). The priority video data can be communicated in the mesh network 218 via the additional shortest communication route B at 228 while the priority voice data is communicated in the mesh network 218 via the shortest communication route A at 224. Distributing the data traffic throughout the mesh network 202 to utilize more of the nodes balances the load of data traffic within the network and also increases the efficiency of the network.

In one or more embodiments, a best communication route C at 234 in the mesh network 218 can also be determined to communicate non-priority data from the source node 220 to the destination node 222. The best communication route C at 234 can be based on a highest bit rate to communicate the non-priority data. For example, non-priority data can be communicated from the source node (SN) 220 to the destination node (DN) 222 via any number of intermediate nodes (IN4) 236, (IN5) 238, (IN6) 240, and (IN7) 242 (e.g., the best communication route C at 234 is SN→IN4→IN5→IN6→IN7→DN).

The priority voice data can then be communicated in the mesh network 218 via the shortest communication route A at 224 in less time than the non-priority data is communicated via the best communication route C at 234. Although the best communication route C at 234 has a higher bit rate, the additional hops at the multiple intermediate nodes introduce link management, packet queuing, transmission, and other processing delays. Even though the shortest communication route A at 224 may have a significantly slower bit rate than the best communication route, the fewer number of hops at the intermediate nodes decreases the number of processing delays and the priority data can be communicated to the destination node 222 faster along the shortest communication route. In addition, the priority video data can also be communicated in the mesh network 218 via the additional shortest communication route B at 228 in less time than the non-priority data can be communicated via the best communication route C at 234.

Example methods 300 and 400 are described with reference to respective FIGS. 3 and 4 in accordance with one or more embodiments of quality of service for mesh networks. Generally, any of the functions, methods, procedures, components, and modules described herein can be implemented using hardware, software, firmware (e.g., fixed logic circuitry), manual processing, or any combination thereof. A software implementation of a function, method, procedure, component, or module represents program code that performs specified tasks when executed on a computing-based processor. Example methods 300 and 400 may be described in the general context of computer-executable instructions. Generally, computer-executable instructions can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
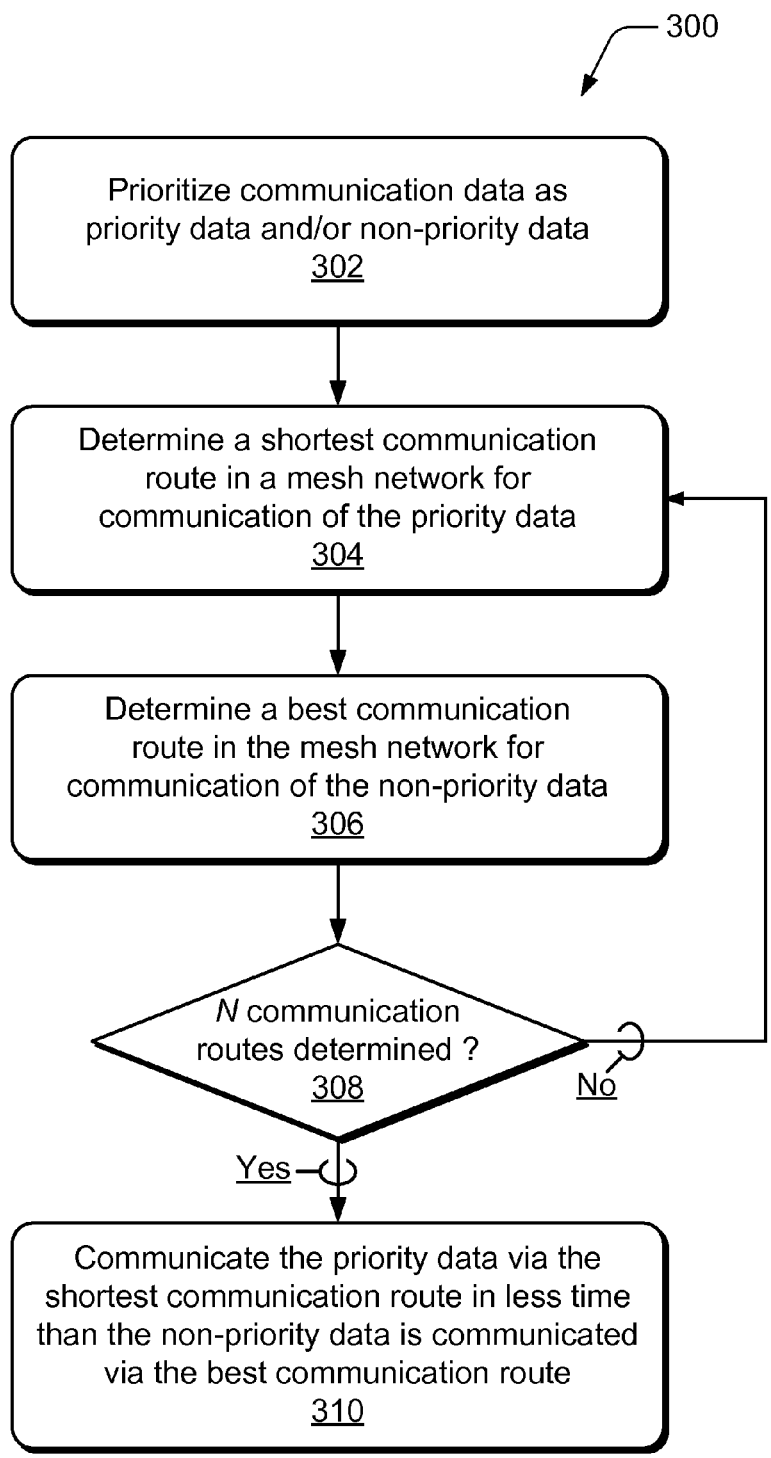
FIG. 3 illustrates example method(s) for quality of service for mesh networks in accordance with one or more embodiments.

FIG. 3 illustrates example method(s) 300 for quality of service for mesh networks. The order in which the method is described is not intended to be construed as a limitation, and any number of the described method blocks can be combined in any order to implement the method, or an alternate method.

At block 302, communication data is prioritized as priority data and/or non-priority data for communication from a source node to a destination node in a mesh network. For example, the source node 104 in mesh network 100 (FIG. 1) initiates and/or receives communication data that is prioritized as priority data, such as voice data and/or video data. Alternatively or in addition, the communication data can include non-priority data, such as best-effort data or background data.

At block 304, a shortest communication route in the mesh network is determined for communication of the priority data from the source node to the destination node. For example, the routing logic 130 at node device 102 in mesh network 100 determines the shortest communication route 110 based on a minimum number of intermediate nodes via which the priority data is communicated. In an implementation, the routing logic 130 prioritizes intermediate nodes in the shortest communication route 110 that are implemented to support quality of service for communication of the priority data in the mesh network. Alternatively or in addition, the routing logic 130 determines the shortest communication route 110 by routing all route request packets from the source node 104 to the destination node 106 via the intermediate nodes, and the route request packets are returned back to the source node 104 from the destination node 106.

At block 306, a best communication route in the mesh network is determined for communication of the non-priority data from the source node to the destination node. For example, the routing logic 130 at node device 102 in mesh network 100 determines the best communication route 116 based on a highest bit rate to communicate the non-priority data. In an embodiment, the routing logic 130 determines an optimal communication route in a mesh network that is both the best communication route having the highest bit rate and the shortest communication route having the minimum number of intermediate nodes.

At block 308, a determination is made as to whether an N number of communication routes have been determined. For example, the routing logic 130 at node device 102 determines an optionally configurable N number of shortest communication route(s) 136 and best communication route(s) 138 in a mesh network. The multiple route determinations provide for additional and/or backup routes in an event that an initially determined communication route fails. In addition, the multiple communication routes provide that heavy data traffic within the mesh network 100 can be distributed throughout the various mesh nodes for increased efficiency of the mesh network.

If an N number of communication routes have not been determined (i.e., "no" from block 308), then the method continues at block 304 to determine an additional shortest communication route in the mesh network, and subsequently continues at block 306 to determine an additional best communication route in the mesh network. If an N number of communication routes have been determined (i.e., "yes" from block 308), then at block 310, the priority data is communicated via the shortest communication route in less time than the non-priority data is communicated via the best communication route.

Figure 4:
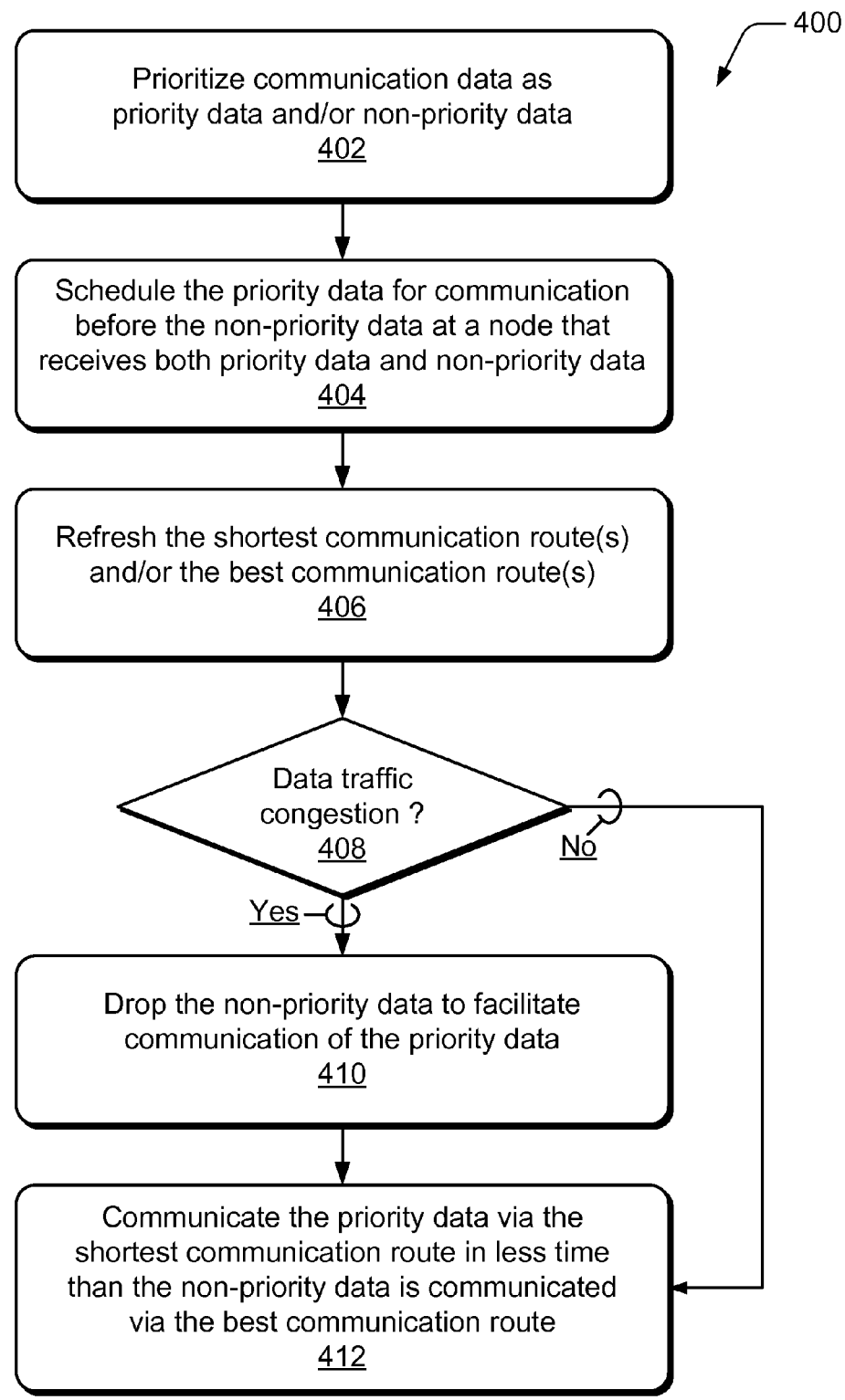
FIG. 4 illustrates example method(s) for quality of service for mesh networks in accordance with one or more embodiments.

FIG. 4 illustrates example method(s) 400 for quality of service for mesh networks. The order in which the method is described is not intended to be construed as a limitation, and any number of the described method blocks can be combined in any order to implement the method, or an alternate method.

At block 402, communication data is prioritized as priority data and/or non-priority data for communication from a source node to a destination node in a mesh network. For example, the source node 104 in mesh network 100 (FIG. 1)

initiates and/or receives communication data that is prioritized as priority data, such as voice data and/or video data. Alternatively or in addition, the communication data can include non-priority data, such as best-effort data or background data.

At block 404, the priority data is scheduled for communication before the non-priority data at an intermediate node of the mesh network that receives both the priority data and the non-priority data. For example, a node device 102 in mesh network 100 can receive both priority data and non-priority data, and the distribution scheduler 142 schedules the priority data for communication before the non-priority data.

At block 406, the shortest communication route(s) and/or the best communication route(s) are refreshed at the intermediate node of the mesh network. For example, the routing logic 130 at node device 102 can initiate the method 300 (at blocks 304-308) described with reference to FIG. 3 to refresh or otherwise re-determine the shortest communication route(s) and/or the best communication route(s) in a mesh network.

At block 408, a determination is made as to whether the data traffic at an intermediate node is a cause of congestion or transmission delay. For example, the routing logic 130 at node device 102 monitors data traffic load at the node and/or determines whether the data traffic load causes communication delays. If the data traffic at a node device is not a cause of congestion (i.e., "no" from block 408), then at block 412, the priority data is communicated via the shortest communication route in less time than the non-priority data is communicated via the best communication route. If the data traffic at a node device is a cause of congestion (i.e., "yes" from block 408), then at block 410, the non-priority data is dropped to facilitate communication of the priority data (at block 412). For example, a node device 102 in mesh network 100 can receive both priority data and non-priority data, and the distribution scheduler 142 drops the non-priority data to facilitate communication of the priority data if an abundance of data traffic causes congestion at the node device.

Figure 5:
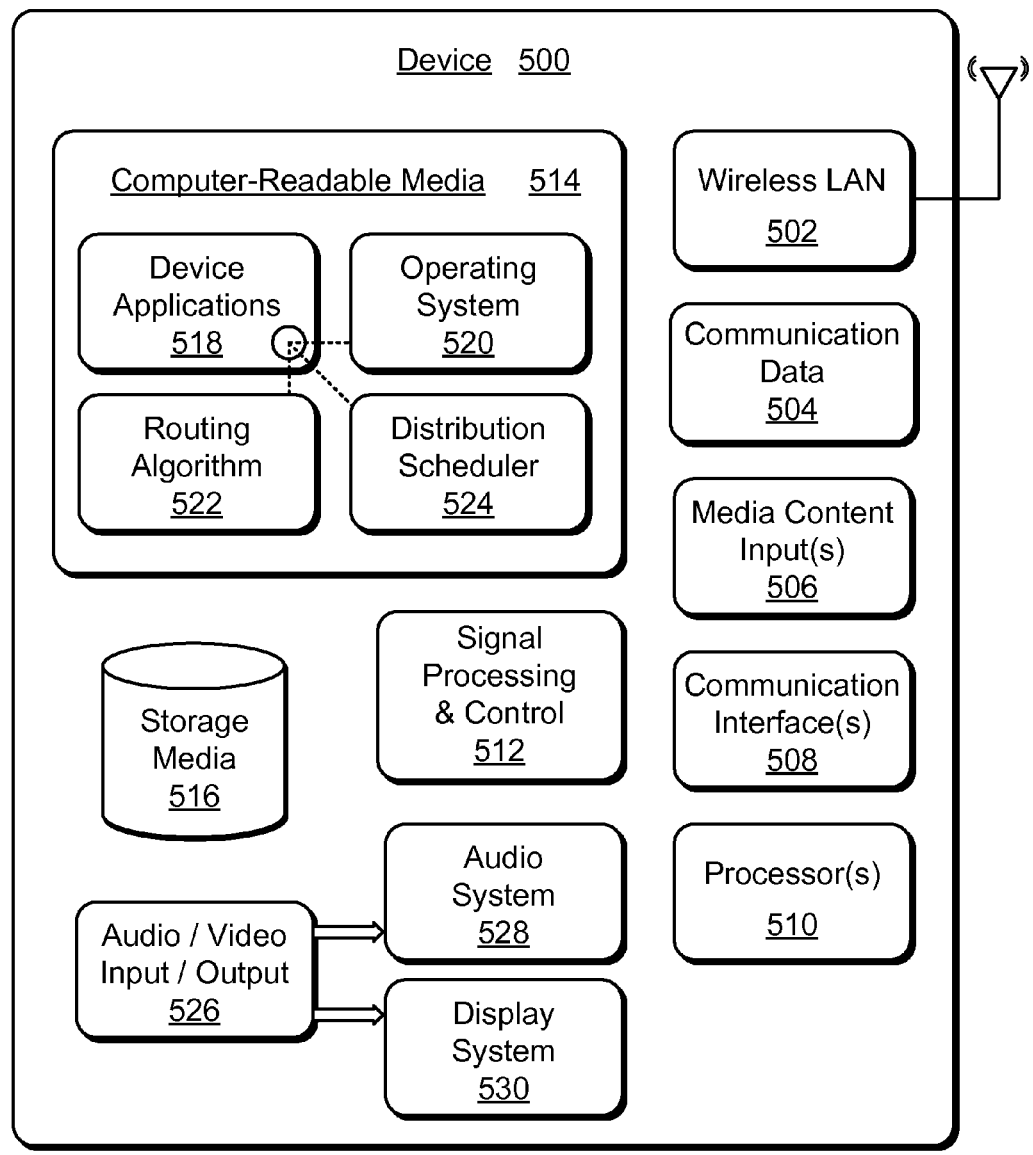
FIG. 5 illustrates various components of an example device that can implement embodiments of quality of service for mesh networks when implemented as a node device in a mesh network.

FIG. 5 illustrates various components of an example device 500 that can be implemented as any form of a communication-enabled device to implement various embodiments of quality of service for mesh networks. For example, device 500 can be implemented as a node device (e.g., any of a source node, destination node, or intermediate node) in a mesh network, such as mesh network 100 shown in FIG. 1 or mesh network 218 shown in FIG. 2. In various embodiments, device 500 can be implemented as any one or combination of a media device, computer device, telephone (e.g., cellular, VoIP, Wi-Fi, etc.), high definition television (HDTV), television set-top box, appliance device, gaming device, electronic device, vehicle, workstation, access point, and/or as any other type of device implemented for data communication as a node in a mesh network.

Device 500 includes wireless LAN (WLAN) components 502, that enable wireless communication of communication data 504 (e.g., received communication data, communication data that is being received, communication data scheduled for broadcast, data packets of the communication data, etc.). Device 500 can also include one or more media content input(s) 506 via which any type of media content can be received, such as music, television media content, and any other type of audio, video, and/or image media content received from a media content source which can be rendered and/or displayed for viewing.

Device 500 can also include communication interface(s) 508 that can be implemented as any one or more of a serial and/or parallel interface, a wireless interface, any type of network interface, a modem, and as any other type of communication interface. A wireless interface enables device 500 to receive control input commands and other data from an input device, such as from a remote control device, a portable computing-based device (such as a cellular phone), or from another infrared (IR) or similar RF input device.

Device 500 can also include one or more processor(s) 510 (e.g., any of microprocessors, controllers, and the like) which process various computer-executable instructions to control the operation of device 500, to communicate with other electronic and computing devices, and to implement embodiments of quality of service for mesh networks. Alternatively or in addition, device 500 can be implemented with any one or combination of hardware, firmware, or fixed logic circuitry that is implemented in connection with signal processing and control circuits which are generally identified at 512.

Device 500 can include computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 500 may also include a mass storage media device 516.

Computer-readable media 514 provides data storage mechanisms to store the communication data 504, as well as various device applications 518 and any other types of information and/or data related to operational aspects of device 500. For example, an operating system 520 can be maintained as a computer application with the computer-readable media 514 and executed on processor(s) 510. The device applications 518 can also include a routing algorithm 522 and a distribution scheduler 524 when device 500 is implemented as a node device in a mesh network. In this example, the device applications 518 are shown as software modules and/or computer applications that can implement various embodiments of quality of service for mesh networks.

Device 500 can also include an audio and/or video input/output system 526 that provides audio data to an audio rendering system 528 and/or provides video data to a display system 530. The audio rendering system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, audio rendering system 528 and/or the display system 530 can be implemented as external components to device 500. Alternatively, the audio rendering system 528 and/or the display system 530 can be implemented as integrated components of the example device 500.

Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

FIGS. 6-13 illustrate some examples of various devices that can each be implemented as any form of a communication-enabled device to implement various embodiments of quality of service for mesh networks. For example, any of the various devices can be implemented as a node device (e.g., any of a source node, destination node, or intermediate node) in a mesh network, such as mesh network 100 shown in FIG. 1 or mesh network 218 shown in FIG. 2.

Figure 6:
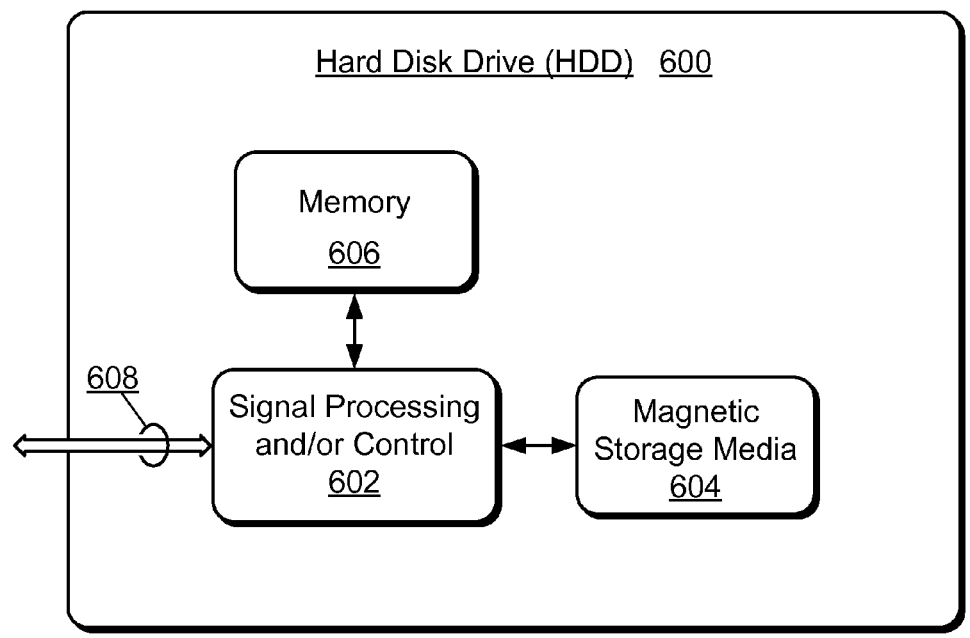
FIGS. 6-13 illustrate some examples of various devices that can each be implemented as a node device in a mesh network.

FIG. 6 illustrates an example node device that may be embodied as a hard disk drive (HDD) 600, which includes signal processing and/or control circuit(s) generally identified at 602. The HDD 600 can also include a magnetic storage media 604 and/or a memory 606, such as random access memory (RAM), a low-latency nonvolatile memory such as flash memory, read only memory (ROM), and/or other suitable electronic data storage. In various implementations, the signal processing and/or control circuit(s) 602 can be implemented to process data (e.g., any of encoding, decoding, encryption, and/or decryption), perform data calculations, and/or format data. The data can be output to and/or received from at least the magnetic storage media 604 and/or the memory 606. In addition, the HDD 600 can communicate with a host device (not shown) such as a computer or mobile computing devices, such as a personal digital assistant, cellular phone, media or MP3 player, and/or other devices via one or more wired or wireless communication links 608.

Figure 7:
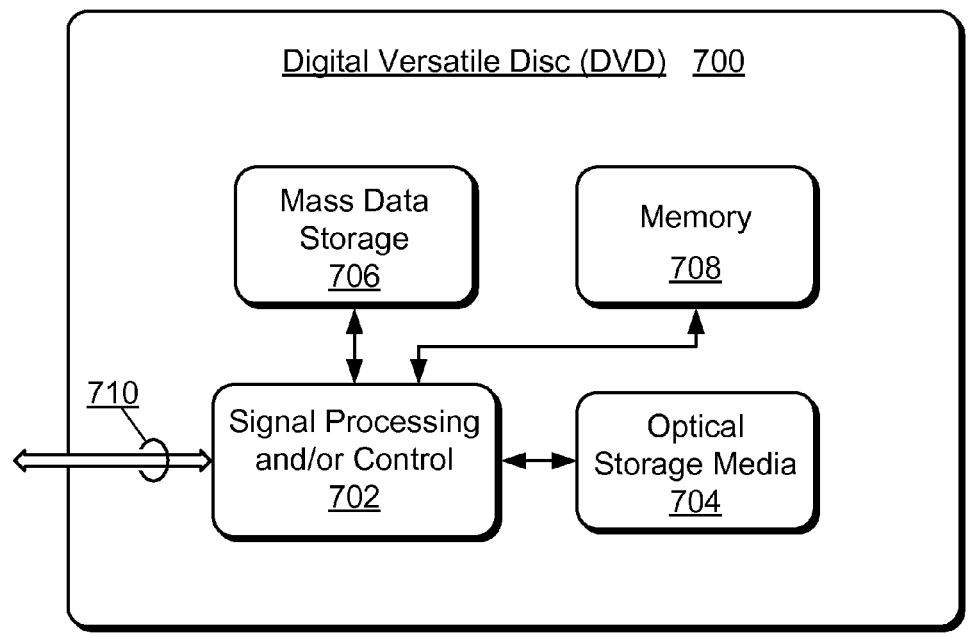

FIG. 7 illustrates an example node device that may be embodied as a digital versatile disc (DVD) drive 700, which includes signal processing and/or control circuit(s) generally identified at 702. The DVD 700 can also include an optical storage media 704, mass data storage 706, and/or a memory 708, such as random access memory (RAM), a low-latency nonvolatile memory such as flash memory, read only memory (ROM), and/or other suitable electronic data storage. The mass data storage 706 can store data in a nonvolatile manner, and may include a hard disk drive (HDD) such as described with reference to FIG. 6, which may be a mini HDD that includes one or more platters having a diameter that is smaller than approximately 1.8 inches.

In various implementations, the signal processing and/or control circuit(s) 702 can be implemented to process data (e.g., any of encoding, decoding, encryption, and/or decryption), perform data calculations, format data, and/or any other signal processing functions associated with a DVD drive. The data can be written to and/or read from at least the optical storage media 704 and/or the memory 708. In addition, the DVD 700 can communicate with an output device (not shown) such as a computer, television, and/or other devices via one or more wired or wireless communication links 710.

Figure 8:
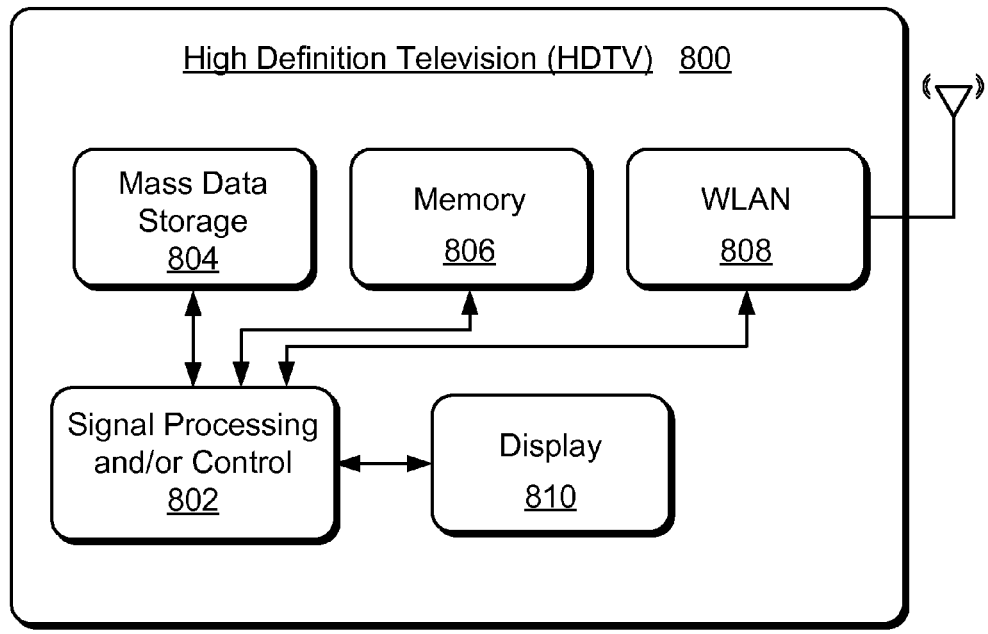

FIG. 8 illustrates an example node device that may be embodied as a high definition television (HDTV) 800, which includes signal processing and/or control circuit(s) generally identified at 802. The HDTV 800 can also include mass data storage 804 and/or a memory 806, such as random access memory (RAM), a low-latency nonvolatile memory such as flash memory, read only memory (ROM), and/or other suitable electronic data storage. The mass data storage 804 can store data in a nonvolatile manner, and may include an optical storage media as described with reference to FIG. 7, and/or a hard disk drive (HDD) such as described with reference to FIG. 6, which may be a mini HDD that includes one or more platters having a diameter that is smaller than approximately 1.8 inches.

In various implementations, the signal processing and/or control circuit(s) 802 can be implemented to process data (e.g., any of encoding, decoding, encryption, and/or decryption), perform data calculations, format data, and/or any other signal processing functions associated with an HDTV. The data can be output to and/or received from at least the memory 806. In addition, the HDTV 800 includes a wireless local area network (WLAN) interface 808 via which input signals can be received in either a wired or wireless format. HDTV output signals can be generated for a display 810.

Figure 9:
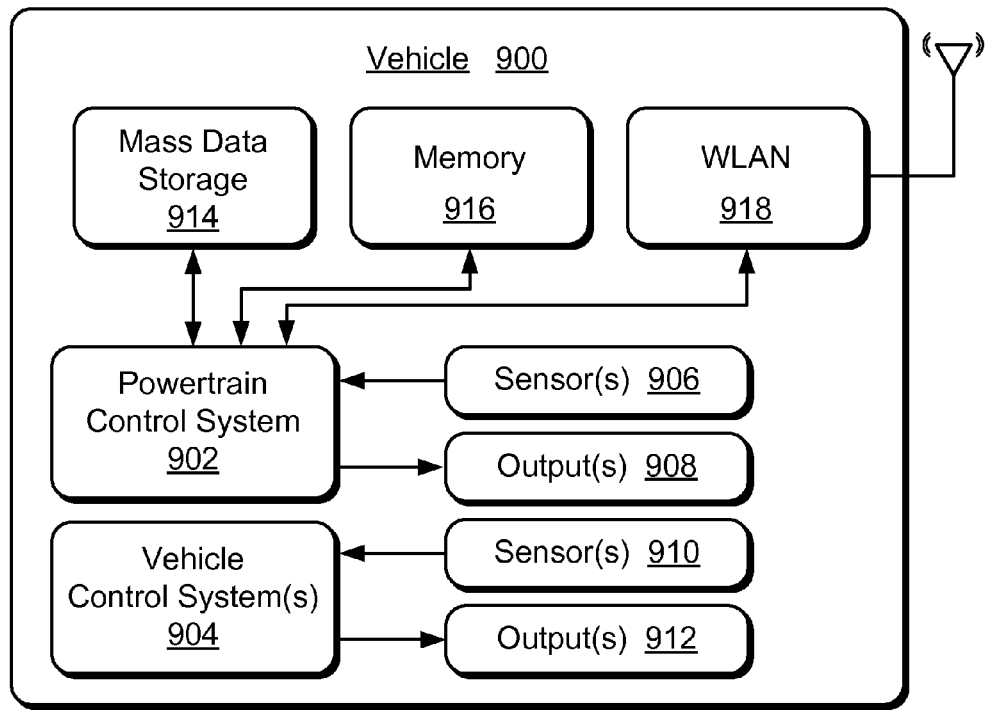

FIG. 9 illustrates an example node device that may be embodied as a vehicle 900, which includes a powertrain control system 902 and, optionally, additional vehicle control system(s) 904. The powertrain control system 902 can receive data inputs from one or more sensors 906 such as temperature sensors, pressure sensors, rotational sensors, airflow sensors, and/or any other suitable sensors. The powertrain control system 902 can receive the data inputs and generate one or more output control signals 908, such as engine operating parameters, transmission operating parameters, and/or other control signals.

Additional control system(s) 904 may likewise receive data signals from one or more input sensors 910 and/or generate output control signals 912 to one or more output devices. In various implementations, a control system 904 may be part of an anti-lock braking system (ABS), a navigation system, a telematics system, a vehicle telematics system, a lane departure system, an adaptive cruise control system, and/or a vehicle entertainment system such as a stereo, DVD, compact disc, and the like.

The vehicle 900 can also include mass data storage 914 and/or a memory 916, such as random access memory (RAM), a low-latency nonvolatile memory such as flash memory, read only memory (ROM), and/or other suitable electronic data storage. The mass data storage 914 can store data in a nonvolatile manner, and may include an optical storage media as described with reference to FIG. 7, and/or a hard disk drive (HDD) such as described with reference to FIG. 6, which may be a mini HDD that includes one or more platters having a diameter that is smaller than approximately 1.8 inches. In addition, vehicle 900 includes a wireless local area network (WLAN) interface 918 via which input signals can be received in either a wired or wireless format. The powertrain control system 902 also may support connections with a WLAN via the WLAN interface 918.

Figure 10:
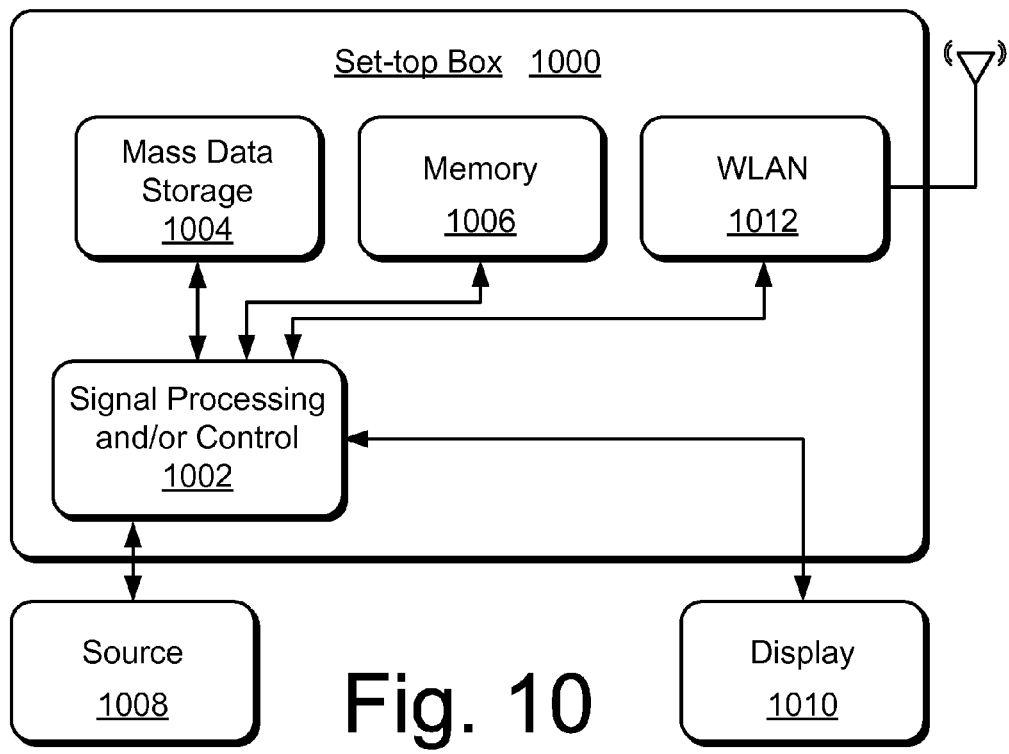

FIG. 10 illustrates an example node device that may be embodied as a television set-top box 1000, which includes signal processing and/or control circuit(s) generally identified at 1002. The set-top box 1000 can also include mass data storage 1004 and/or a memory 1006, such as random access memory (RAM), a low-latency nonvolatile memory such as flash memory, read only memory (ROM), and/or other suitable electronic data storage. The mass data storage 1004 can store data in a nonvolatile manner, and may include an optical storage media as described with reference to FIG. 7, and/or a hard disk drive (HDD) such as described with reference to FIG. 6, which may be a mini HDD that includes one or more platters having a diameter that is smaller than approximately 1.8 inches.

The set top box 1000 can receive data signals from a source 1008, such as a broadband source, and can then output standard and/or high definition audio/video signals suitable for a display 1010, such as a television, monitor, and/or other video and/or audio output devices. In various implementations, the signal processing and/or control circuit(s) 1002 can be implemented to process data (e.g., any of encoding, decoding, encryption, and/or decryption), perform data calculations, format data, and/or any other signal processing functions associated with a television set-top box. The data can be output to and/or received from at least the memory 1006 and/or the source 1008. In addition, the set-top box 1000 includes a wireless local area network (WLAN) interface 1012 via which input signals can be received in either a wired or wireless format. The set-top box 1000 may also support connections with a WLAN via the WLAN interface 1012.

Figure 11:
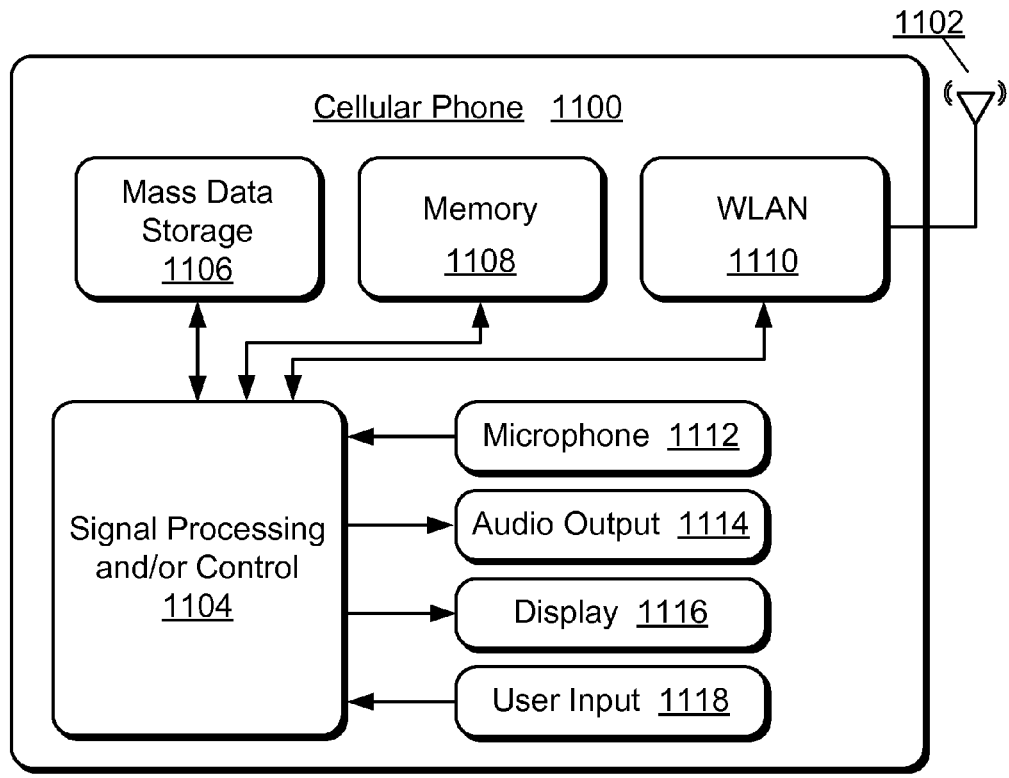

FIG. 11 illustrates an example node device that may be embodied as a cellular phone 1100, which includes a cellular antenna 1102 and signal processing and/or control circuit(s) generally identified at 1104. The cellular phone 1100 can also include mass data storage 1106 and/or a memory 1108, such as random access memory (RAM), a low-latency nonvolatile memory such as flash memory, read only memory (ROM), and/or other suitable electronic data storage. The mass data storage 1106 can store data in a nonvolatile manner, and may include an optical storage media as described with reference to FIG. 7, and/or a hard disk drive (HDD) such as described with reference to FIG. 6, which may be a mini HDD that includes one or more platters having a diameter that is smaller than approximately 1.8 inches.

In various implementations, the signal processing and/or control circuit(s) 1104 can be implemented to process data (e.g., any of encoding, decoding, encryption, and/or decryption), perform data calculations, format data, and/or any other signal processing functions associated with a cellular phone. The data can be output to and/or received from at least the memory 1108. In addition, the cellular phone 1100 includes a wireless local area network (WLAN) interface 1110 via which input signals can be received in a wireless format. The cellular phone 1100 may also support connections with a WLAN via the WLAN interface 1110. In some implementations, the cellular phone 1100 can include a microphone 1112, an audio output 1114 such as a speaker and/or audio output jack, a display 1116, and/or an input device 1118 such as a keypad, pointing device, voice actuation, and/or other input device.

Figure 12:
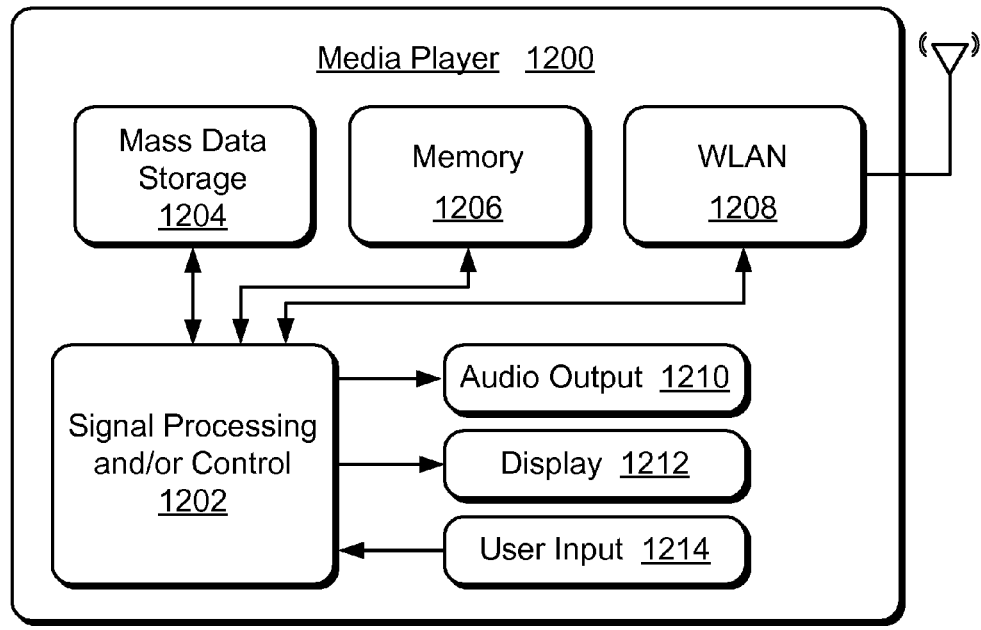

FIG. 12 illustrates an example node device that may be embodied as a media player 1200, which includes signal processing and/or control circuit(s) generally identified at 1202. The media player 1200 can also include mass data storage 1204 and/or a memory 1206, such as random access memory (RAM), a low-latency nonvolatile memory such as flash memory, read only memory (ROM), and/or other suitable electronic data storage. The mass data storage 1204 can store data, such as compressed audio and/or video content, in a nonvolatile manner. In some implementations, compressed audio files include files that are compliant with an MP3 format or other suitable compressed audio and/or video formats. The mass data storage 1204 may include an optical storage media as described with reference to FIG. 7, and/or a hard disk drive (HDD) such as described with reference to FIG. 6, which may be a mini HDD that includes one or more platters having a diameter that is smaller than approximately 1.8 inches.

In various implementations, the signal processing and/or control circuit(s) 1202 can be implemented to process data (e.g., any of encoding, decoding, encryption, and/or decryption), perform data calculations, format data, and/or any other signal processing functions associated with a media player. The data can be output to and/or received from at least the memory 1206. In addition, the media player 1200 includes a wireless local area network (WLAN) interface 1208 via which input signals can be received in either a wired or wireless format. The media player 1200 may also support connections with a WLAN via the WLAN interface 1208. In some implementations, the media player 1200 can include an audio output 1210 such as a speaker and/or audio output jack, a display 1212, and/or an input device 1214 such as a keypad, touchpad, pointing device, voice actuation, and/or other input device. In various implementations, media player 1200 may employ a graphical user interface (GUI) that typically includes menus, drop down menus, icons, and/or a point-and-click interface via display 1212 and/or user input 1214.

Figure 13:
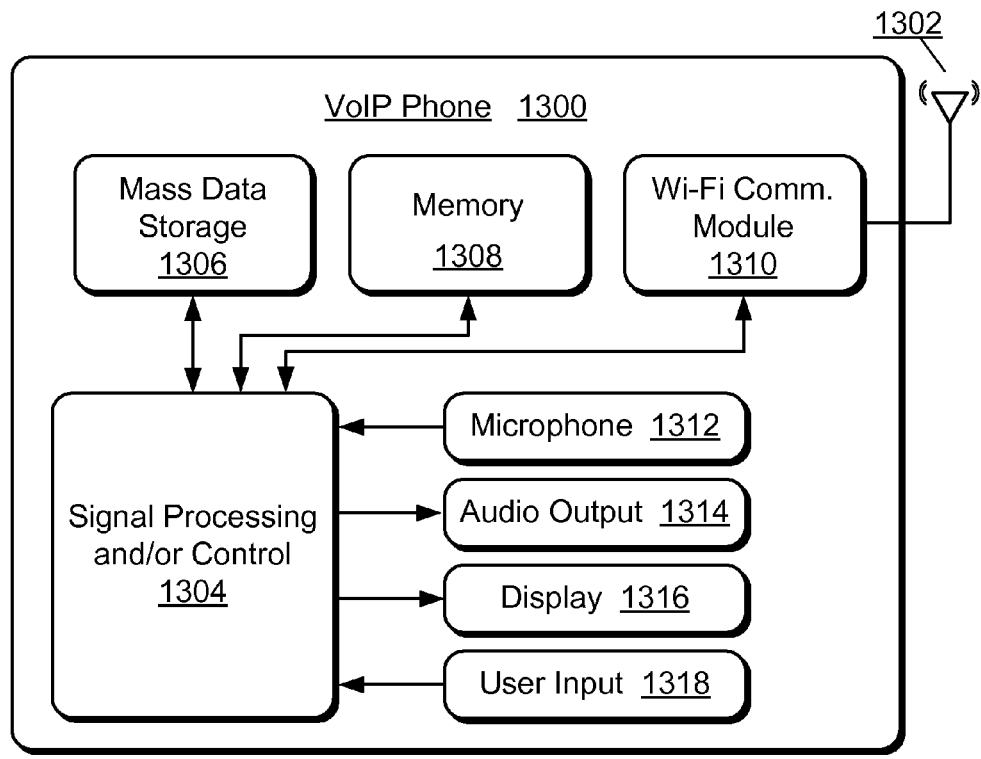

FIG. 13 illustrates an example node device that may be embodied as a Voice over Internet Protocol (VoIP) phone 1300, which includes an antenna 1302 and/or is implemented in connection with a VoIP box that enables a conventional telephone to be plugged in and utilized with VoIP technology. The VoIP phone 1300 also includes signal processing and/or control circuit(s) generally identified at 1304. The VoIP phone 1300 can also include mass data storage 1306 and/or a memory 1308, such as random access memory (RAM), a low-latency nonvolatile memory such as flash memory, read only memory (ROM), and/or other suitable electronic data storage. The mass data storage 1306 can store data in a nonvolatile manner, and may include an optical storage media as described with reference to FIG. 7, and/or a hard disk drive (HDD) such as described with reference to FIG. 6, which may be a mini HDD that includes one or more platters having a diameter that is smaller than approximately 1.8 inches.

In various implementations, the signal processing and/or control circuit(s) 1304 can be implemented to process data (e.g., any of encoding, decoding, encryption, and/or decryption), perform data calculations, format data, and/or any other signal processing functions associated with a VoIP phone. The data can be output to and/or received from at least the memory 1308. In addition, the VoIP phone 1300 includes a Wireless Fidelity (Wi-Fi) communication module 1310 via which communication links with a VoIP network can be established. In some implementations, the VoIP phone 1300 can include a microphone 1312, an audio output 1314 such as a speaker and/or audio output jack, a display 1316, and/or an input device 1318 such as a keypad, pointing device, voice actuation, and/or other input device.

Although embodiments of quality of service for mesh networks have been described in language specific to features and/or methods, it is to be understood that the subject of the appended claims is not necessarily limited to the specific features or methods described. Rather, the specific features and methods are disclosed as example implementations of quality of service for mesh networks.

The invention claimed is:

1. A method for routing communication data from a source node to a destination node in a wireless mesh network, the method comprising:
   prioritizing, at the source node, the communication data as being of a first priority or a second priority, wherein the first priority is higher than the second priority;
   in response to the communication data being prioritized as being of the first priority, determining, at the source node, a first route in the wireless mesh network through which the communication data is to be communicated from the source node to the destination node, wherein the first route has a minimum number of intermediate nodes between the source node and the destination node relative to that of another potential route; and in response to the communication data being prioritized as being of the second priority, determining, at the source node, a second route in the wireless mesh network through which the communication data is to be communicated from the source node to the destination node, wherein the second route has a higher bit rate relative to that of another potential route, wherein determining the first route and determining the second route at the source node each comprises:
(i) sending, from the source node, a route request to the destination node via intermediate nodes of at least two potential routes, and
(ii) receiving, at the source node, a reply to the route request from the destination node via the intermediate nodes of the at least two potential routes.

2. The method as recited in claim 1, wherein an amount of time to communicate the communication data of the first priority via the first route is less than an amount of time to communicate the communication data of the second priority via the second route.

3. The method as recited in claim 1, wherein the communication data is at least one of voice data or video data, and wherein the at least one of voice data or video data is prioritized as the communication data of the first priority for communication from the source node to the destination node via the first route.

4. The method as recited in claim 1, wherein the communication data is at least one of best-effort data or background data, and wherein the at least one of best-effort data or background data is prioritized as the communication data of the second priority for communication from the source node to the destination node via the second route.

5. The method as recited in claim 1, further comprising causing, at one of the intermediate nodes of the wireless mesh network that receives both the communication data of the first priority and the communication data of the second priority, the communication data of the first priority to be scheduled for communication before the communication data of the second priority.

6. The method as recited in claim 1, further comprising causing, at one of the intermediate nodes of the wireless mesh network that receives both the communication data of the first priority and the communication data of the second priority, the communication data of the second priority to be dropped to facilitate communication of the communication data of the first priority.

7. The method as recited in claim 1, wherein determining the first route includes prioritizing the intermediate nodes of the wireless mesh network that support quality of service for communicating of the communication data of the first priority.

8. A source node device configured to route communication data to a destination node device in a wireless mesh network, the source node device comprising:
a data priority monitor configured to prioritize the communication data as being of a first priority or a second priority, wherein the first priority is higher than the second priority;
routing logic configured to:
in response to the communication data being prioritized as being of the first priority, determine, at the source node device, a first route in the wireless mesh network through which the communication data is to be communicated from the source node device to the destination node device, wherein the first route has a minimum number of intermediate node devices between the source node device and the destination node device relative to that of another potential route; and in response to the communication data being prioritized as being of the second priority, determine, at the source node device, a second route in the wireless mesh network through which the communication data is to be communicated from the source node device to the destination node device, wherein the second route has a higher bit rate relative to that of another potential route, wherein to determine each of the first route and the second route at the source node device, the routing logic is configured to:
(i) send, from the source node device, a route request to the destination node device via intermediate node devices of at least two potential routes through the wireless mesh network, and
(ii) receive, at the source node device, a reply to the route request from the destination node device via the intermediate node devices of the at least two potential routes through the wireless mesh network.

9. The source node device as recited in claim 8, wherein the routing logic is further configured to determine that a time duration to communicate the communication data of the first priority via the first route is less than a time duration to communicate the communication data of the second priority via the second route.

10. The source node device as recited in claim 8, wherein an aggregate of delays caused by communication processing at each intermediate node device of the first route is less than an aggregate of delays caused by communication processing at each intermediate node device of the second route.

11. The source node device as recited in claim 8, wherein the communication data is at least one of best-effort data or background data, and wherein the data priority monitor is further configured to prioritize the at least one of best-effort data or the background data as the communication data of the second priority for communication from the source node device to the destination node device via the second route.

12. The source node device as recited in claim 8, wherein the routing logic is further configured to determine an optimal route that has the higher bit rate and the minimum number of intermediate node devices.

13. The source node device as recited in claim 8, wherein the routing logic is further configured to determine, in response to failure of the first route and based on the minimum number of intermediate node devices, a third route in the wireless mesh network to communicate the communication data of the first priority from the source node device to the destination node device.

14. The source node device as recited in claim 8, wherein the routing logic is further configured to initiate a routing of the route requests from the source node device to the destination node device via respective intermediate node devices of the first route and the second routes, and wherein the replies to the route requests are routed back to the source node device from the destination node device via the respective intermediate node devices of the first route and the second route through the wireless mesh network.

15. One or more computer-readable memory devices comprising computer executable instructions that, responsive to execution by a processor, implement operations to route communication data from a source node to a destination node in a wireless mesh network, the operations comprising:

prioritizing, at the source node, the communication data as being of a first priority or a second priority, wherein the first priority is higher than the second priority;

in response to the communication data being prioritized as being of the first priority, determining, at the source node, a first route in the wireless mesh network through which the communication data is to be communicated from the source node to the destination node, wherein the first route has a minimum number of intermediate nodes between the source node and the destination node relative to that of another potential route; and in response to the communication data being prioritized as being of the second priority, determining, at the source node, a second route in the wireless mesh network through which the communication data is to be communicated from the source node to the destination node, wherein the second route has a higher bit rate relative to that of another potential route, wherein determining the first route and determining the second route at the source node each comprises:
  (i) sending, from the source node, a route request to the destination node via intermediate nodes of at least two potential routes, and
  (ii) receiving, at the source node, a reply to the route request from the destination node via the intermediate nodes of the at least two potential routes.

16. The one or more computer-readable memory devices as recited in claim 15, comprising additional computer-executable instructions that, responsive to execution by the processor, implement operations comprising determining, prior to communicating the communication data of the first priority, that a time duration to communicate the communication data of the first priority via the first route is less than a time duration to communicate the communication data of the second priority via the second route.

17. The one or more computer-readable memory devices as recited in claim 15, comprising additional computer-executable instructions that, responsive to execution by the processor, implement operations comprising determining an optimal route that has the higher bit rate and the minimum number of intermediate nodes within the wireless mesh network.

18. The one or more computer-readable memory devices as recited in claim 15, wherein an aggregate of delays caused by communication processing at each intermediate node of the first route is less than an aggregate of delays caused by communication processing at each intermediate node of the second route.

19. The one or more computer-readable memory devices as recited in claim 15, wherein determining the first route includes prioritizing the intermediate nodes of the wireless mesh network that support quality of service for communicating of the communication data of the first priority.

20. The one or more computer-readable memory devices as recited in claim 15, wherein the wireless mesh network is implemented as a wireless LAN (WLAN) communication system and data packets of the communication data are communicated in accordance with the Institute of Electrical and Electronics Engineers (IEEE) Standard 802.11s.

* * * * *